United States Patent [19]
Tomita et al.

[11] Patent Number: 5,238,041
[45] Date of Patent: Aug. 24, 1993

[54] SKIVING EQUIPMENT AND METHOD FOR RECAPPING TIRE

[75] Inventors: Shuji Tomita; Yoshihiro Fukamachi, both of Kodaira, Japan

[73] Assignee: Bridgestone Corporation, Tokyo, Japan

[21] Appl. No.: 872,325

[22] Filed: Apr. 23, 1992

[30] Foreign Application Priority Data

May 17, 1991 [JP] Japan .................................. 3-140748

[51] Int. Cl.⁵ ............................................ B29D 30/68
[52] U.S. Cl. ...................................................... 157/13
[58] Field of Search ............... 157/13, 1; 51/DIG. 33, 51/165.71, 165.72, 165.74, 165.76

[56] References Cited
FOREIGN PATENT DOCUMENTS 1164607 6/1989 Japan .

*Primary Examiner*—D. S. Meislin
*Attorney, Agent, or Firm*—Sughrue, Mion, Zinn, Macpeak & Seas

[57] ABSTRACT

A skiving equipment which permits a great reduction of labor and also permits the skiving work to be done always to an appropriate extent. This skiving equipment 1 includes a rotating member 6 for rotating a buffed tire about an axis while supporting the tire; a camera 41 for photographing a belt portion of the tire; a camera controller 44 for analyzing skiving conditions, including a skiving position, from a photographed image obtained by the camera; a grinder 20 which operates in accordance with skiving condition signals provided from the camera controller 44 to skive the belt portion of the tire in each skiving position; a proximity sensor 31 for detecting the position of wire embedded in the tire; an optical sensor 32 for checking whether the wire is exposed or not; and a controller 45 for controlling the operation of the rotating member 6 and that of the grinder 20 in accordance with information provided from the camera controller 44, proximity sensor 31 and optical sensor 32, the robot controller controlling the movement of the grinder 20 in accordance with the skiving conditions, including a skiving position, provided from the camera controller 44, determining the number of times of skiving in one skiving position on the basis of the detected information provided from the proximity sensor 31, and controlling the grinder 20 to stop the skiving work in the skiving position when the exposure of the wire is detected by the optical sensor 32.

8 Claims, 9 Drawing Sheets

SKIVING EQUIPMENT AND METHOD FOR RECAPPING TIRE

BACKGROUND OF THE INVENTION

The present invention relates to a skiving equipment and method for skiving a damaged part of tire automatically following buffing at time of the recapping the tire.

Heretofore, the skiving work in recapping a tire has been performed by skiving a damaged part of the tire using an air grinder held by a worker and with a special skiving blade (rasp) attached thereto. During the skiving operation, buff powder is splashed, sparks are emitted by contact of the skiving blade with wire, or the vibration of the grinder affects the human operator. Thus, the skiving work environment has not been good.

In Japanese Laid Open Patent publication No. 164607/89, there is described a tire repairing equipment in which the skiving work is partially automated. In this tire repairing equipment, a skiving operation, the application of cement and the injection of rubber are preformed successively for a damaged part of tire. In the skiving work, a worker measures the position, size and depth of a damage on the tire surface by means of a measuring devices and the measured values thus obtained are inputted and registered to a vision device for detection at every measurement. Then, the degree of skiving is determined on the basis of such registered information, and an automatic skiving operation is performed using a grindstone.

Thus, in the tire repairing equipment described in the above laid-open patent publication, it is required for the worker to measure the position, size and depth of a damage on the tire surface and input the measured values to the vision device for detection. These measuring and inputting operations are laborious.

Further, once the degree of skiving is determined from the state of damage, a skiving operation is performed automatically in accordance with the degree of skiving thus determined, so the skiving operation is allowed to proceed until the determined degree of skiving is reached irrespective of the state of wire embedded in the tire, so that the wire may be damaged or cut.

Particularly, since a person determines the state of damage, it is very likely that there will occur a measurement error. Upon occurrence of a measurement error, the degree of skiving may be too small or too large resulting in the wire being cut, thus making it impossible to recap the tire in an exact manner. Therefore, ample care must be exercised in checking the state of damage of each tire, and it is also required to take care to avoid the occurrence of error at the time of inputting the results of measurement to the vision device for detection. Thus, the worker is heavily burdened.

The present invention has been accomplished in view of the above-mentioned point and it is the object of the invention to provide skiving equipment for recapping tire capable of effecting a skiving operation always to an appropriate extent without imposing a heavy burden on a worker.

SUMMARY OF THE INVENTION

According to the present invention, in order to achieve the aforementioned object, there is provided a skiving equipment for recapping tire, including a rotating means for rotating a buffed tire about an axis while supporting the tire; a photographing means for photographing a belt portion of the tire; an image analyzing means for analyzing skiving conditions, e.g. a skiving position, from a photographed image obtained by the photographing means; a skiving means which operates in accordance with skiving condition signals provided from the image analyzing means to skive the belt portion of the tire in each skiving position; a wire position detecting means for detecting the position of wire embedded in the tire; a wire exposure checking means for checking whether the wire is exposed or not; and a control means for controlling the operation of the rotating means and that of the skiving means in accordance with information provided from the image analyzing means, the wire position detecting means and the wire exposure checking means, the control means controlling the movement of the skiving means in accordance with the skiving conditions, e.g. a skiving position, provided from the image analyzing means, determining the number of times of skiving in one skiving position on the basis of the detected information provided from the wire position detecting means, and controlling the skiving means to stop the skiving work in the skiving position when the exposure of the wire is detected by the wire exposure checking means.

If a suitable mark is put in a skiving position (a part to be skived) of a buffed tire, the image analyzing means analyzes skiving conditions, including a skiving position, from the image of the tire surface photographed by the photographing means. In accordance with the skiving conditions, the control means causes the skiving means to move to the skiving position, then determines the number of times of skiving on the basis of detected information on the wire position, and causes the skiving means to perform a skiving operation by the number of times of skiving. However, when the exposure of the wire is detected by the wire exposure checking means, the skiving operation is stopped even halfway.

All that is required for the worker is to put a mark in the skiving position on the tire after buffing, and all the other operations are included in the skiving work which is carried out automatically, thus permitting great reduction of the labor.

Further, since the number of times of skiving is determined on the basis of information on the wire position and the skiving operation is performed while checking the exposure of the wire and is stopped upon detection of the wire exposure, it is possible to adjust the degree of skiving always appropriately.

DESCRIPTION OF PREFERRED EMBODIMENTS

An embodiment of the present invention will be described below with reference to FIG. 1 to 11.

Figure 1:
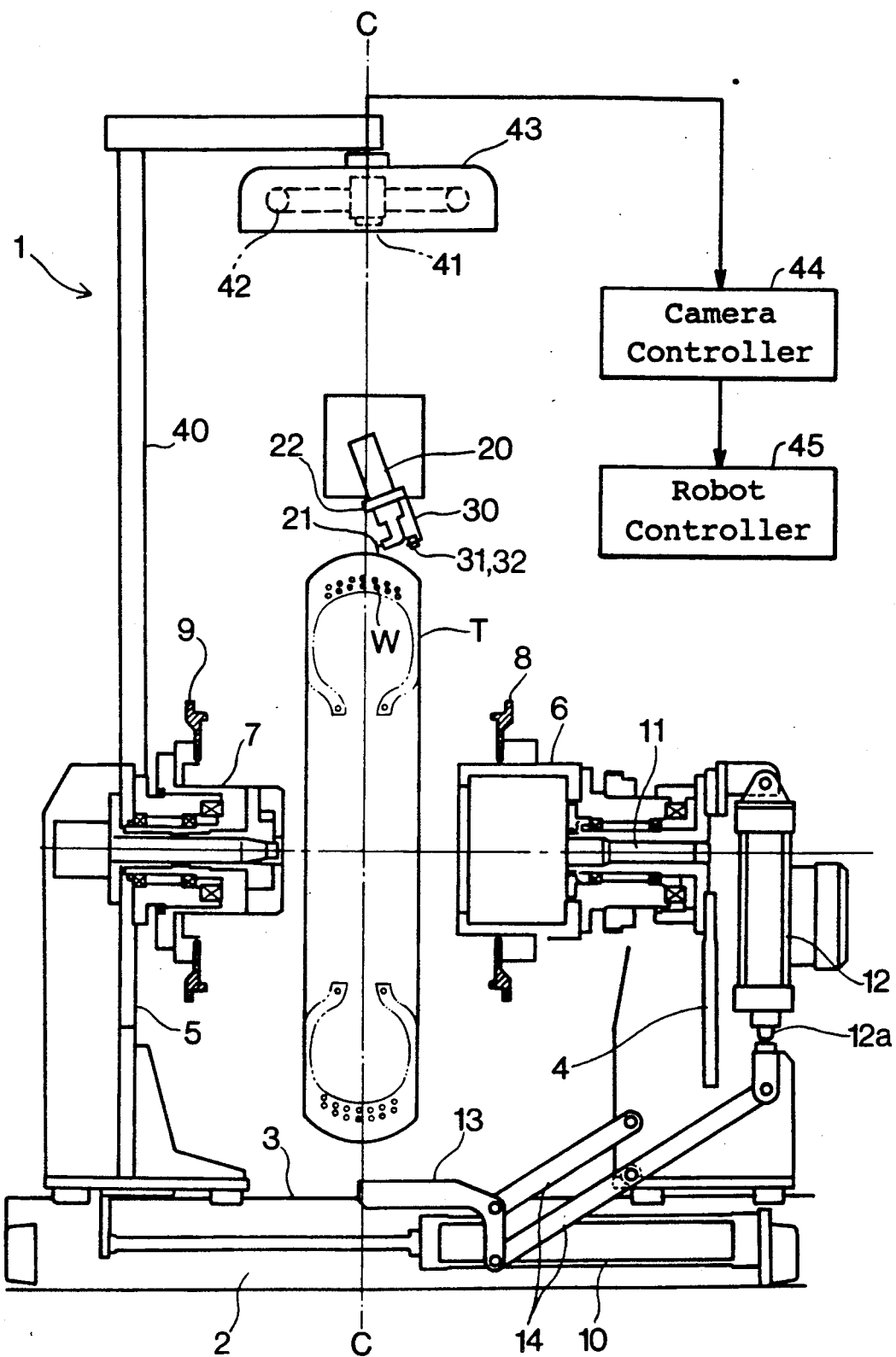
FIG. 1 is a front view of the whole of a skiving equipment according to an embodiment of the present invention.

FIG. 1 is a front view of the entire skiving equipment 1 according to this embodiment. A rail 3 is extended in the transverse direction on a base 2 and a pair of slidable support members 4 and 5 are erected on the rail 3 to be slidable right and left on the rail. The slidable support members 4 and 5 are provided with rotatable members 6 and 7, respectively, which are projecting in an opposed relation to each other and which are provided with rims 8 and 9, respectively. The slidable support members 4 and 5 are moved symmetrically with respect to a reference plane C—C by means of a cylinder device 10. When the rotatable members 6 and 7 approach each other with the movement of the slidable support members 4 and 5, a tire T is held between the rims 8 and 9.

The rotatable members 6 and 7 are rotatable about a common horizontal axis, and as they rotate, the tire T gripped by the rims 8 and 9 also rotates. Thus, the rotatable members 4 and 5 constitute rotating means for rotating the tire about the axis while supporting the tire.

An air passage 11 is formed for supplying an air pressure into the tire T through the rotatable member 6 from one slidable support member 4.

A cylinder device 12 is provided sideways of the slidable support member 4, and a piston rod 12a thereof and a tire support member 13 are connected together through a link mechanism 14 so that the support member 13 is moved up and down by means of the cylinder device 12.

The tire T after buffing, which has been fed to the skiving equipment 1, is supported on the support member 13 and moves upward together with the support member 13. Then, the slidable support members 4 and 5 approach each other and the right and left rims 8, 9 hold the bead portion of the tire T therebetween. Thereafter, air pressure is fed into the tire T through the air passage 11.

On the other hand, an air grinder 20 is disposed above the tire T thus supported. A front end of the air grinder 20 is bent at a right angle and a rotatable shaft 20a is projecting from this bent portion, with a disk-like rasp 21 being fitted on the shaft 20a (See FIG. 3).

The air grinder 20 itself is supported by a support plate 22 so that the rasp 21 is positioned along the circumference of the tire T.

Figure 2:
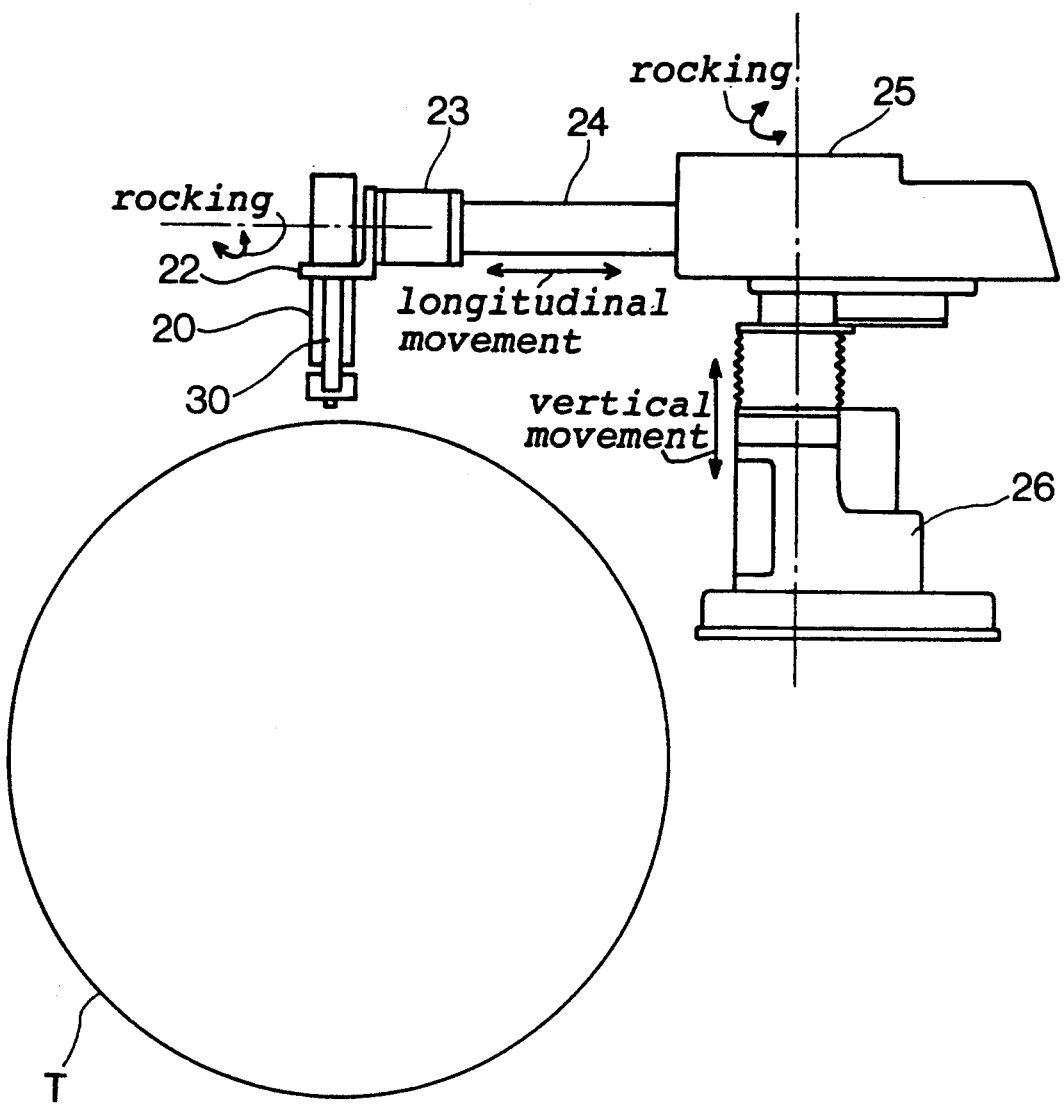
FIG. 2 is a side view of a principal portion thereof.
Figure 3:
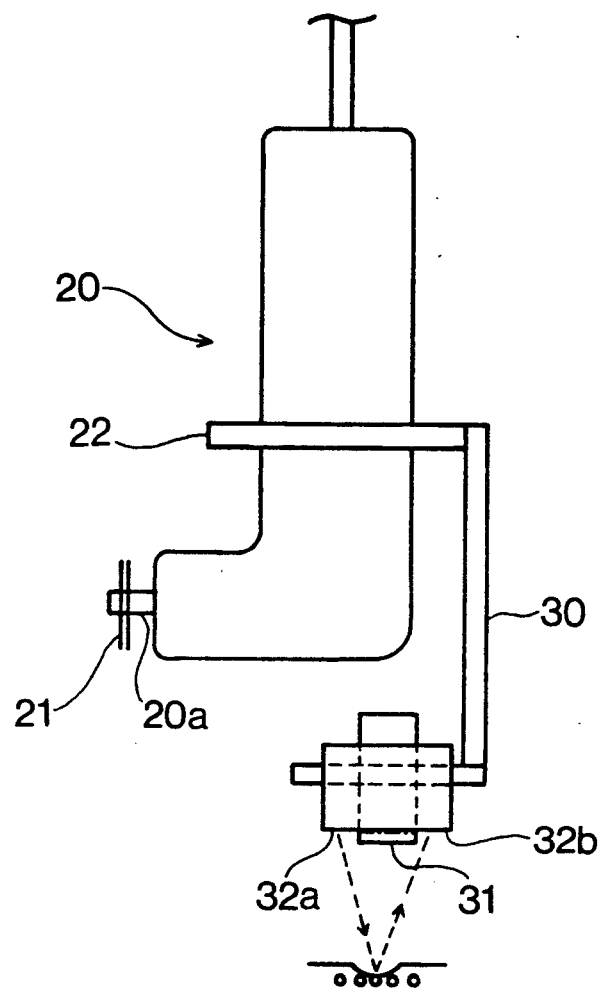
FIG. 3 is a front view of the principal portion.

As shown in FIG. 2, the support plate 22 is supported rockably about a horizontal axis by a rocking device 23 disposed behind the support plate. The rocking device 23 is fixed to an end portion of a rod 24 which is projecting forward for extension and withdrawal from an extending/withdrawing device 25. The extending/withdrawing device 25 is supported vertically movably and rockably about a vertical axis by means of a lift/rocking device 26.

The position of the rasp 21 is adjusted by both the extending/withdrawing device 25 and the lift/rocking device 26, and the angle of inclination of the rasp 21 is adjusted by the rocking device 23, whereby the rasp can be opposed to a skiving position on the tire T which has been set. While the rasp 21 rotates, it rocks according to rocking motions of the lift/rocking device, whereby skiving is performed. Further, the rasp 21 is moved vertically by the lift/rocking device 26, whereby the depth of cut is adjusted.

A projecting piece 30 extends from the support plate 22 which supports the air grinder 20, a proximity sensor 31 and an optical sensor 32. Sensor 32 comprises a light emitting element 32a and a light sensing element 32b that are attached to an end portion of the projecting piece 30 (See FIG. 3). Therefore, by rocking the support plate 22 with the rocking device 23, the proximity sensor 31 and the optical sensor 32, instead of the rasp 21, can be opposed to the cutting position on the tire T. In this state, the sensors 31 and 32 are moved down by the lift/rocking device 26, whereby the position of wires W embedded in the tire T can be detected, and an exposed state of the wires W can be detected by the optical sensor 32.

In a fixed upper position above the set tire T, a camera 41 is supported by a support rod 40 and suspended vertically movably therefrom. Around the camera 41 there is disposed a light 42 which is covered above with a reflective plate 43.

When the rod 24 is withdrawn and the air grinder 20 is in its retracted position, the camera 41 and the light 42 move down from above and the light 42 illuminates the belt portion of the tire T at a predetermined height. Then, the camera 41 photographs the illuminated belt portion.

The thus-photographed image is inputted to a camera controller 44 and analyzed thereby, then the result of the analysis is inputted to a robot controller 45, which in turn sets the air grinder to a skiving ready state on the basis of the analysis result.

Figure 4:
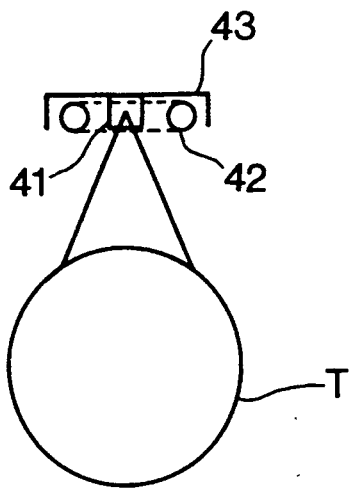
FIG. 4 is a schematic diagram showing a photographing state using a camera.

FIG. 4 schematically illustrates a photographing state using the camera 41, in which the surface of the belt portion of the tire T is photographed in a camera field corresponding to the size of the tire T.

For example, it is here assumed that the camera field is adjusted to 300 mm in width and 200 mm in the circumferential direction by adjusting the height of the camera 41. In this case, the tire T is rotated 200 mm at a time in the circumferential direction and photographed at every such rotation. In this manner the tire surface is photographed throughout the whole circumference thereof.

Figure 5:
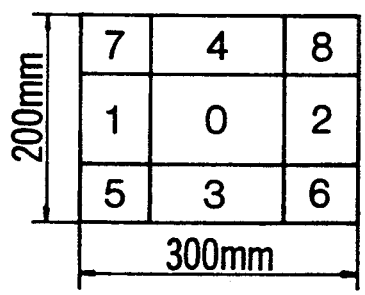
FIG. 5 is a diagram showing a divided state of the camera field.

Using white paint for example, a mark is placed beforehand on each part of the tire T after buffing the part to be subjected to cutting, e.g. a damaged part. Therefore, this mark is viewed in any position in the camera field of an image which has been photographed by the camera 41. If the camera field is divided into nine portions as shown in FIG. 5 and numbers G (=0, 1, 2, ... 8) are affixed to the so-divided portions, the mark positions can be represented by such numbers.

Figure 6:
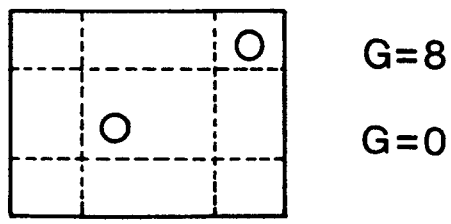
FIG. 6 is diagram similar to FIG. 5, with marks viewed in the camera field.

FIG. 6 shows a state in which two marks (circular marks) are viewed in the camera field. More specifically, one mark is present centrally (G=0) of a crown center portion and the other mark is present in a rear position (G=8) of a right-hand crown shoulder portion. Each mark is identified according to its area and shape.

The number of divisions of the camera field can be further increased and it is also possible to determine the mark positions using XY coordinates in which X and Y axes represent the width direction and the circumferential direction, respectively.

The proximity sensor 31 is a metal sensitive sensor which senses a magnetic change and detects the distance to metal. When the proximity sensor 31 has drawn a certain distance near steel wires W embedded in the tire T, it turns on. Therefore, the distance from the rasp 21 up to the wires W is determined from that approached distance, whereby the number of times of skiving is determined.

Figure 7:
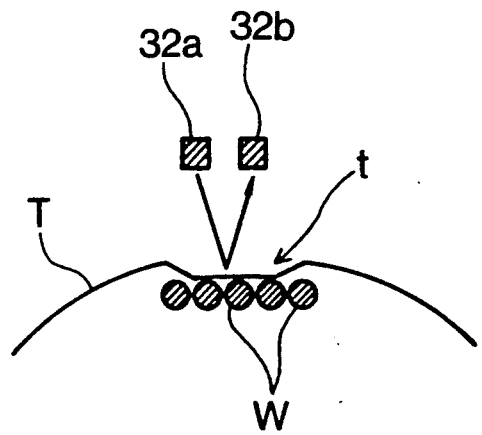
FIG. 7 is a diagram showing a wire exposure checking state using a optical sensor.

In the optical sensor 32, light is emitted from the light emitting element 32a, then reflected and this reflected light is viewed by the light sensing element 32b. When the wires W are in an embedded state into the tire T, the quantity of the reflected light is small. When the wires W are exposed, the quantity of the light reflected by the wires is large, so on the basis of the difference in the quantity of light it is possible to check whether the wires W are exposed or not (FIG. 7).

Figure 8A:
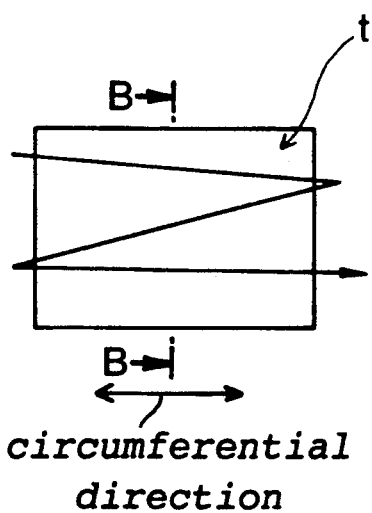
FIG. 8A is a plan view showing a scanning pattern of the optical sensor.
Figure 8B:
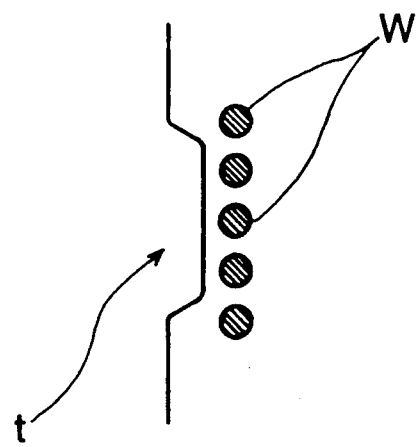
FIG. 8B is a sectional view taken along line B—B in FIG. 8A.

As indicated by an arrow in FIG. 8A, the optical sensor 32 scans above a part t of the tire T in a zigzag fashion and detects whether the wires W are exposed or not.

Figure 9A:
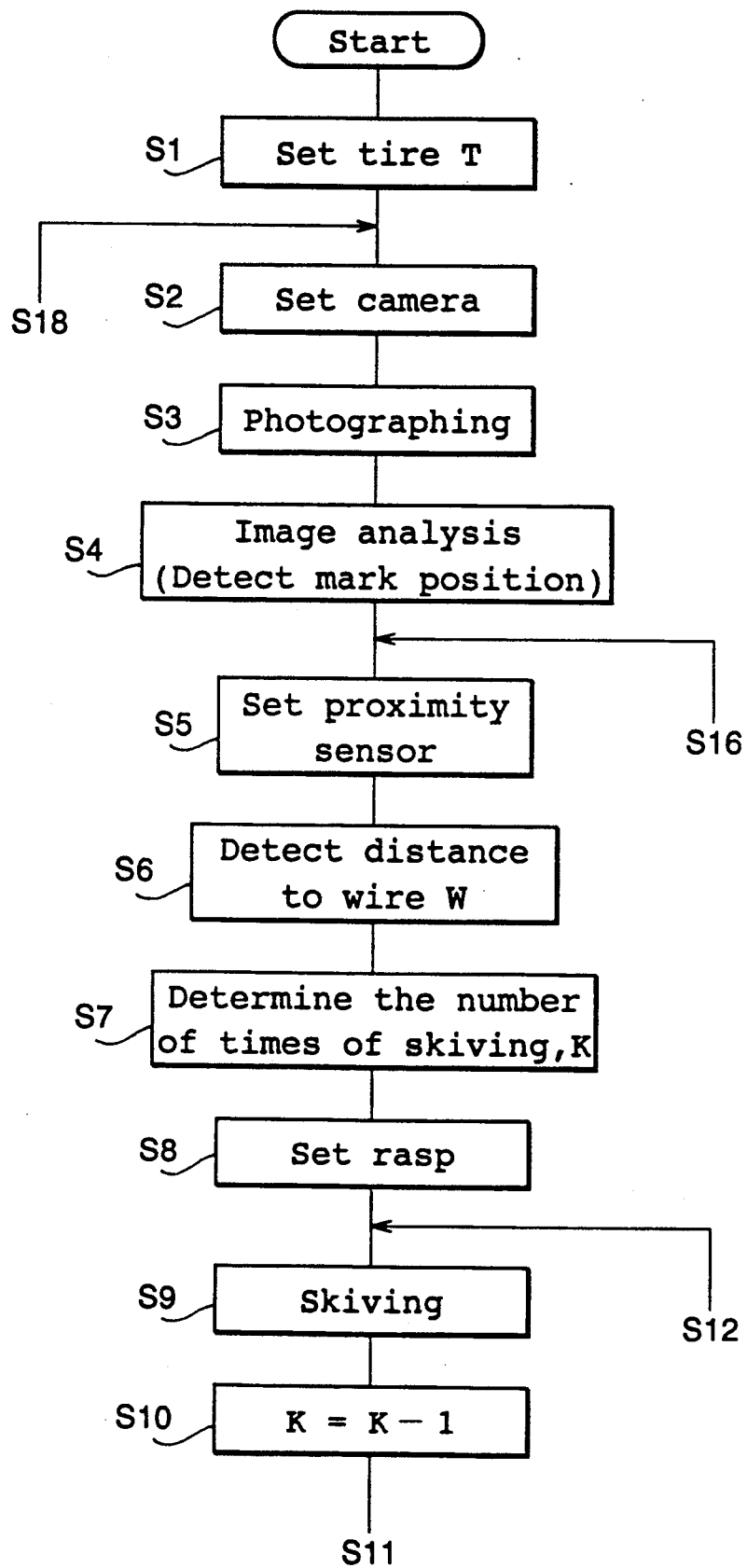
FIGS. 9a and 9b are flowcharts showing a skiving work control procedure.
Figure 9B:
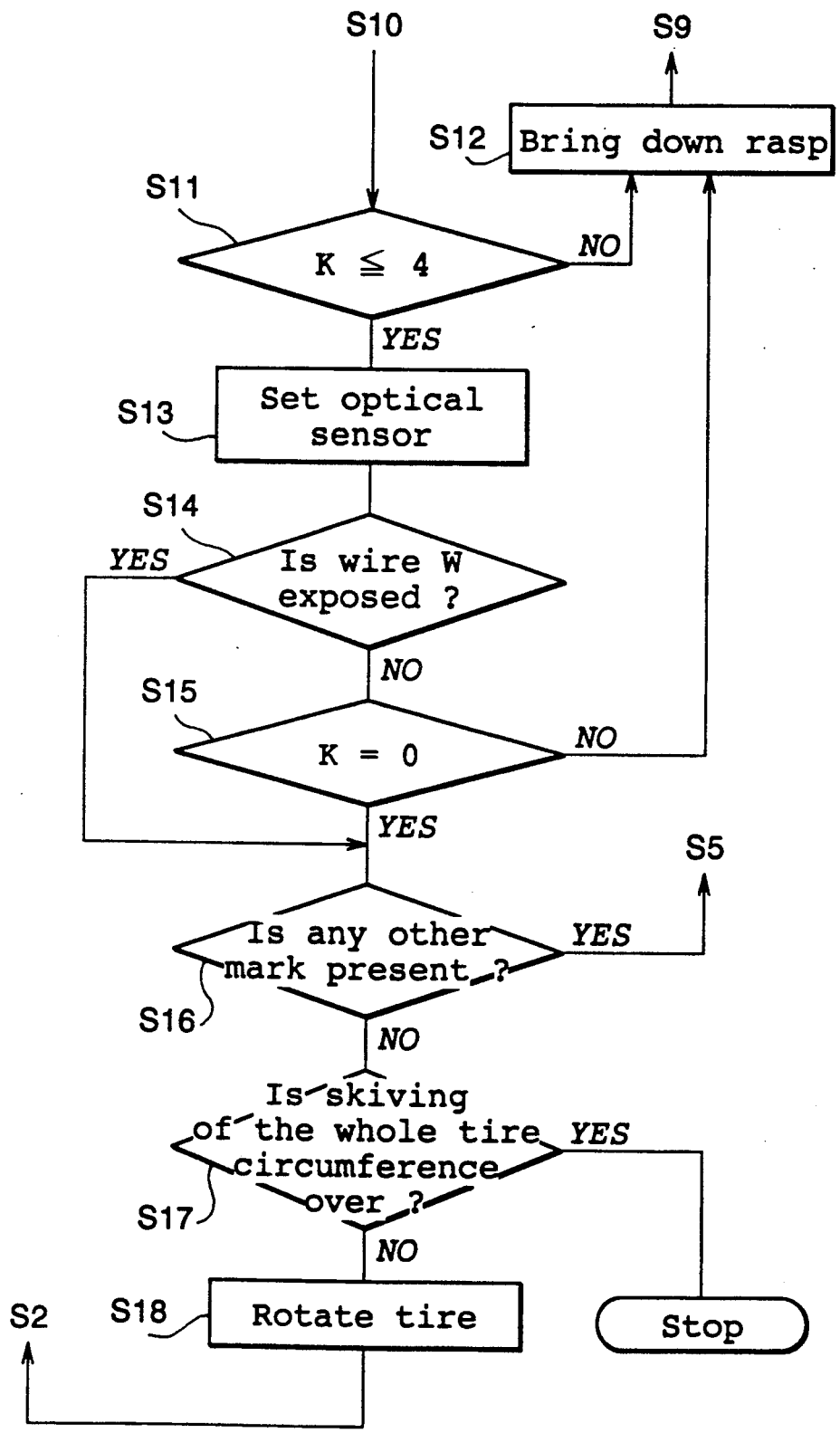

The following description is now provided about a control procedure executed by the robot controller 45 in the skiving equipment of the above construction, with reference to the flowchart of FIG. 9.

After the tire T is set to its skiving ready state by the rims 8 and 9 (step 1), the camera 41 is set to a photographing ready state (step 2) and the surface of the tire T is photographed (step 3).

Then, in step 4, an image analysis is made by the camera controller 44 and a mark position on the tire surface is detected and memorized. Thereafter, the proximity sensor 31 is set to the detected mark position (step 5) and the distance up to the wires W is detected by the proximity sensor 31 (step 6). From the result of this detection there is determined a number of times K of skiving (step 7).

Then, the rasp 21 is set to the skiving ready state at a required tilting angle according to the skiving position (step 8) and skiving is performed by the rasp step 21 (step 9).

Figure 10:
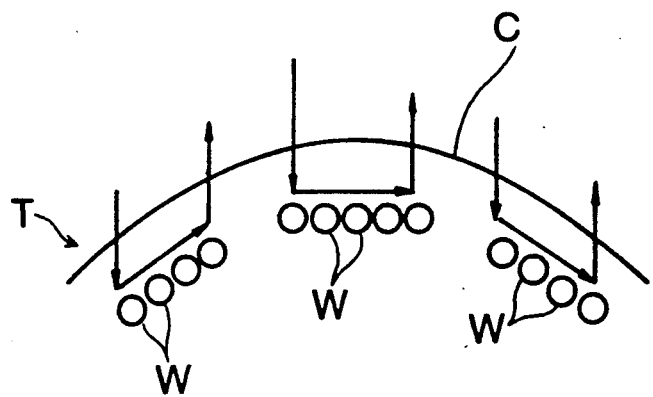
FIG. 10 is an explanatory view showing a moving direction of a rasp.

During the skiving operation, the rasp 21 is moved along a buffing contour C horizontally in the width direction if the skiving position is central, right upwards in the width direction if the skiving position is in the left-hand shoulder portion, or right downwards in the width direction if the skiving position is in the right-hand crown shoulder portion, by the rocking motion and vertical movement of the lift/rocking device, as shown in FIG. 10, while maintaining its posture at the required tilting angle with respect to the surface of the tire after buffing.

Figure 11:
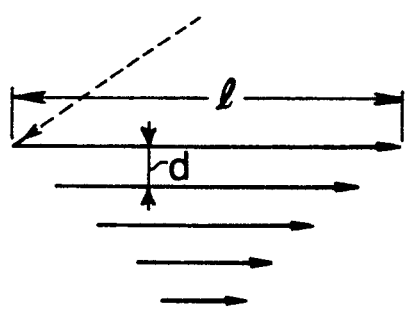
FIG. 11 is an explanatory view showing a skiving pattern.

After a signal indicating that the skiving cycle is over, K is decremented (step 10), and whether K is not larger than 4 is determined (step 11). If K is still 5 or larger, the flow advance to step 12, in which the rasp 21 is brought down about 0.5 mm. Then, the flow again returns to step 9 to perform skiving. According to the skiving pattern, as shown in FIG. 11, the depth d increases 0.5 mm at every skiving cycle and a transverse skiving length l becomes smaller gradually as the skiving cycle proceeds.

The skiving cycle proceeds in accordance with the skiving pattern (steps 9, 10, 11 and 12), and in the last four skiving cycles, since $K \leq 4$, the flow advances from step 11 to step 13, in which the optical sensor 32 is set above the position where the skiving operation was performed, to check whether the wires W are exposed or not (step 14). The optical sensor 32 scans the skived portion in such a manner as shown in FIG. 8A and checks whether the wires W are exposed or not.

In the case where the exposure of the wires W is not detected, a check is made to see whether K=0 or not (step 15). If K is not zero, the flow advances to step 12, in which the rasp 21 is brought down, and skiving is again performed (step 9).

In this way, the steps 9, 10, 13, 14, 15 and 12 are repeated to effect skiving, and upon detection of the wire W exposure during this period, the flow jumps from step 14 to step 16 to complete the skiving work for this skiving portion. If K=0 without detection of the wire W exposure, the flow shifts from step 15 to step 16 to also complete the skiving work for this skiving portion.

Thus, since the number of times of skiving is determined on the basis of the position of the wires W embedded in the tire T, the degree of skiving is always appropriate, and even in the event of exposure of the wires W in the last four skiving cycles, there is no fear of the wires being cut because the skiving work is terminated. When the skiving work for one skiving portion is over, the flow shifts to step 16, in which a check is made to see if a mark is still present in one camera field. If the answer is affirmative, the flow returns to step 5, in which the proximity sensor 31 is set above the position of that mark to detect the distance up to the wires W, followed by repetition of steps 5 to 15 to effect skiving.

When the skiving work for all of the marks present in one camera field is completed, the flow shifts from step 16 to step 17, in which it is judged whether the skiving work for the entire circumference of the tire has been completed or not. If the answer is negative, the flow advance to step 18, in which the tire T is rotated until a belt portion of the tire which has not been subjected to skiving assumes the top position. Then, the flow returns to step 2, in which photographing is performed by the camera 41. Thereafter, the skiving work is conducted for a mark present in another camera field.

In this way, the skiving work is done for the entier circumference of the tire. All that is required for the worker is only putting marks on the tire after buffing, and all of the subsequent skiving operations are performed automatically, thus permitting great reduction of labor.

Although in the above embodiment circular marks are affixed to the tire after buffing as marks merely indicating skiving position, the states of flaws may be expressed using different shapes of marks (for example, circular, square and triangular marks). These marks can be distinguished from one another in the image analysis made by the camera controller 44, by inputting even other data other than skiving positions to the robot controller 45 it is made possible to perform the skiving work under more detailed skiving conditions.

Although in the above embodiment a check is made to see if the wires W are exposed or not from the time when the number of times of skiving becomes the last four, no limitation is placed on the last four skiving cycles, nor is there placed any limitation of the skiving depth of 0.5 mm.

Figure 12:
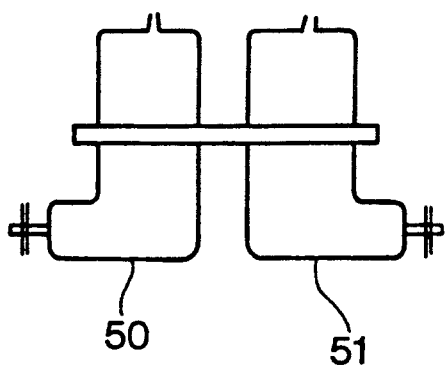
FIG. 12 is a diagram showing an example in which two grinders are integrally fixed together.

The grinder may be a motor-driven type grinder. Also, as shown in FIG. 12, two left and right grinders 50, 51 may be integrally fixed together to skive the left and right sides of the tire separately.

Figure 13:
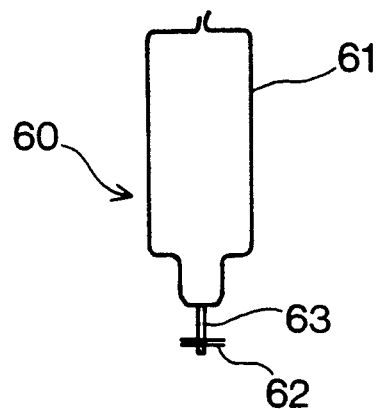
FIG. 13 is a diagram showing a direct acting type grinder.
Figure 14:
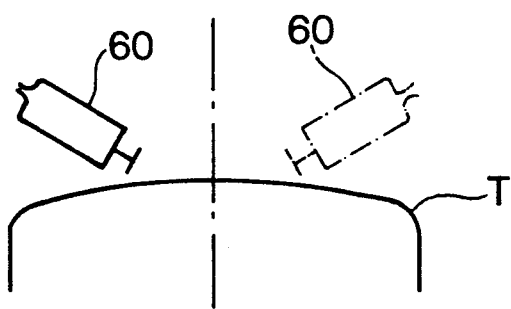
FIG. 14 is a front view showing a cutting state using the grinder.

There also may be used a direct acting type grinder 60 having a rasp 62 positioned in an extending direction of a handle 61 and a rotatable shaft 63 positioned on a central axis of the handle 61, as shown in FIG. 13. By changing the inclination of the grinder 60, as shown in FIG. 14, the central portion as well as the right and left side portions of the tire T can be skived.

The right and left portions of the tire can be skived in directions opposite to each other.

Further, the wire exposure check can be done using the camera 41. More specifically, since each skiving position is known, an image (window) for only the skiving portion is photographed by the camera 41 and judgment is made on the basis of bright-dark difference caused by whether the wires are exposed or not.

What is claimed is:

1. A skiving machine for recapping a tire, including:
   a rotating means for rotating a buffed tire about an axis while supporting the tire;
   a photographing means for photographing a belt portion of the tire;
   an image analyzing means for analyzing skiving conditions, including skiving positions, from a photographed image obtained by said photographing means;
   a skiving means which operates in accordance with skiving condition signals provided from said image analyzing means to skive the belt portion of the tire in each skiving position;
   a wire position detecting means for detecting the position of wire embedded in the tire;
   a wire exposure checking means for checking whether the wire is exposed or not; and
   a control means for controlling the operation of said rotating means and that of said skiving means in accordance with information provided from said image analyzing means, said wire position detecting means and said wire exposure checking means, said control means controlling the movement of said skiving means in accordance with the skiving conditions, including a skiving position, provided from said image analyzing means, determining the number of times of skiving in one skiving portion on the basis of the detected information provided from said wire position detecting means, and controlling said skiving means to stop the skiving work in said skiving position when the exposure of the wire is detected by said wire exposure checking means.

2. A skiving machine according to claim 1, wherein said image analyzing means detects a mark preaffixed to a position to be skived of the tire belt portion, thereby detects the skiving position, and provides a skiving position signal to said control means, and said control means causes said skiving means to move to the skiving position in accordance with said skiving position signal.

3. A skiving machine according to claim 1, wherein said skiving means is constituted by a rasp, said rasp being fed a predetermined distance toward the tire at every skiving cycle by a lift device, and after a residual number of times of skiving to be performed, which is obtained by subtracting a number of skive cycles performed from a total number determined by said control means has reached a predetermined number said, wire exposure means to check if the wire is exposed or not at completion of every skiving cycle.

4. A skiving machine according to claim 1, wherein said wire position detecting means is constituted by a proximity sensor which is sensitive to metal and detects the distance up to the wire which is made of metal, and said wire exposure checking means is constituted by an optical sensor comprising a light emitting element and a light sensing element, said light sensing element sensing light which has been emitted from said light emitting element and reflected by the surface of the tire.

5. A skiving machine according to claim 1, wherein said skiving means, said wire position detecting means and said wire exposure checking means are each disposed in a position above and close to the tire movable away from said position by an extending/withdrawing device and a lift/rocking device and said photographing means is disposed above said skiving means, wire position detecting means and wire exposure checking means movable vertically by a vertically movable support.

6. A skiving method for recapping a tire wherein skiving is performed while a buffed tire is rotated about its axis step by step, comprising:
   photographing a belt portion of the tire;
   analyzing an image obtained by said photographing to determine a position to be skived;
   positioning a skiving means onto said determined position;
   detecting a position of a wire embedded in the tire;
   determining a number of times of skiving to be performed on the basis of said detected position of the wire;
   skiving said belt portion at said position to be skived by said skiving means;
   checking whether the wire is exposed or not at a predetermined time in course of said skiving; and
   stopping said skiving when an exposed wire is detected by said checking or said determined number of times of skiving is completed without detecting the exposed wire.

7. A skiving method according to claim 6, wherein said position to be skived is determined by an image analyzing means detecting a mark preaffixed to a position to be skived of the tire belt portion.

8. A skiving method according to claim 6, wherein said checking is made at every completion of a skiving cycle after a residual of the number of times of skiving to be performed has reached a predetermined number which is obtained by subtracting a number of skive cycles performed from a total number.

* * * * *